United States Patent Office 3,261,882
Patented July 19, 1966

3,261,882
ADHESIVES FROM POLYISOPHTHALAMIDES AND THERMOSETTING EPOXY RESIN SYRUPS
Bert S. Gorton, Wilmington, Del., assignor to E. I. du Pont de Nemours and Company, Wilmington, Del., a corporation of Delaware
No Drawing. Filed Jan. 2, 1963, Ser. No. 248,892
7 Claims. (Cl. 260—830)

This invention relates to adhesive compositions and structures having surfaces adhesively joined together therewith.

Adhesive compositions comprising a synthetic linear polyamide and a polyepoxide are old in the art. The polyoxides used in these compositions of the art generally are those containing at least two epoxy groups per molecule with the remainder of the molecule being a carbon chain or a carbon chain interrupted with ether linkages. The generally preferred of these polyepoxides are those prepared by the catalyzed reaction of a polyhydric alcohol, such as glycols, glycerine, trimethylol propane, polyhydric phenols, and polyphenols, with an excess of an epoxide such as epihalohydrins and alkylene oxides, for example those described in U.S. Patent 2,592,560.

The polyamides most commonly used heretofore in the prior art may be classified as the so-called "nylon-type" polyamides and "the fatty acid-type" polyamides. The nylon-type polyamides are those formed by the condensation polymerization of a polyamine such as ethylene diamine, 1,4-diamino butane, hexamethylene diamine, and the like, with a polycarboxylic acid such as glutaric acid, adipic acid, pimelic acid, suberic acid, sebacic acid, and the like. All of the nylon-type polyamides have in common the presence of a plurality of recurring groups having the structure:

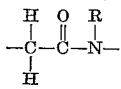

wherein R is hydrogen or an alkyl or alkoxy group having from 1 to about 4 carbon atoms. Many of these nylon-type polyamides are described in U.S. Patent 2,071,253, U.S. Patent 2,130,523, and U.S. Patent 2,130,948. Particularly preferred among these nylon-type polyamides used heretofore are the interpolyamides such as described in U.S. Patent 2,285,009, as is shown in U.S. Patent 2,962,468.

The fatty acid-type polyamides are those prepared by the condensation polymerization of a polyamine with a polymeric fat acid produced from the polymerization of drying or semi-drying oils, such as soybean, linseed, tung, perilla, octicica, cottonseed, corn, tall, sunflower, safflower oils, and the like, or the free acids, or simple aliphatic alcohol esters of such acids. Such fatty acid-type polyamides are described in U.S. Patent 2,450,940.

The polyamide-polyepoxide compositions mentioned above have been used fairly extensively as adhesives, particularly as metal adhesives, that is, as adhesives for adhering one metal substrate to another metal substrate or to some other type of substrate such as wood, glass, leather, plastic and so forth. These compositions provide reasonably good bond strengths at room temperature and thus are satisfactory for some purposes. However, these compositions do not retain satisfactory bond strengths when the adhered substrates are subjected to elevated temperatures, especially when subjected to elevated temperatures in a moisture laden atmosphere or when directly contacted with hot or boiling water (which are both sometimes referred to as "hot-wet conditions").

For many applications it is essential to have an adhesive that will provide good bond strengths at elevated temperatures and under hot-wet conditions. For example, in the manufacture of metal containers for canning foodstuffs (the so-called "tin cans"), it is necessary to use a side-seam adhesive that will retain a satisfactory bond strength when the can is steam-sterilized. Another example is the provision of structural adhesives used in airplane construction, such as adhering wing surface metal to the structural frame, which will retain adequate bond strength under the high temperatures developed when the airplane is in supersonic speed flight. Also in the manufacture of cooking ware it is often convenient to use adhesives, for example, to join handles onto pots and pans, but it is obvious that the adhesive used must withstand the temperatures encountered when such pots and pans are used in cooking. Also, there exists a need for an adhesive for use in the manufacture of internal combustion engines, whereby the engine block may be die cast in two pieces and these two sections adhesively joined together. Not only must the adhesive withstand the elevated temperatures developed by the engine in operation, but in a water-cooled engine, the adhesive bond is subjected to hot-wet conditions. The polyamide-polyepoxide adhesives of the prior art are wholly unsatisfactory for such applications.

An object of this invention is to provide improved polyamide-polyepoxide adhesive compositions. Another object is to provide a polyamide-polyepoxide adhesive composition which provides good bond strengths between metal substrates and which retains adequate bond strengths at elevated temperatures, and furthermore which will retain adequate bond strengths under hot-wet conditions. Other objects will be apparent from the following description of this invention.

These objects are attained by the composition comprising 65-95 parts by weight of a polyamide having the recurring group of the formula:

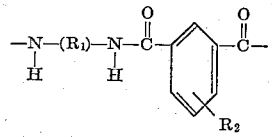

wherein $R_1$ is an alkylene radical having 2-16 carbon atoms and $R_2$ is a member of the group consisting of hydrogen, $C_1$-$C_5$ alkyl radicals and halogens, said polyamide having a molecular weight of 1,000-35,000, and 5-35 parts by weight of a polyepoxide having at least two epoxy groups per molecule, and preferably having a viscosity of 50-200,000 centipoises at 25° C.

The polyamides of this invention may be prepared by the condensation polymerization of an alkylene diamine having 2-16 carbon atoms, such as hexamethylene diamine, tetramethylene diamine, decamethylene diamine, undecamethylene diamine, dodecamethylene diamine, hexadecamethylene diamine, ethylene diamine and so forth, with isophthalic acid or a $C_1$-$C_5$ alkyl or halogen substituted isophthalic acid such as 5-t-butyl-isophthalic acid or 5-chloro-isophthalic acid. The exact method of preparation is not critical. Thus any convenient procedure known in the art may be followed, for example, as shown in U.S.P. 2,715,620.

It is essential that the polyamide used has a molecular weight within the range of about 1000 to about 35,000. The bond strength obtained by the use of a polyamide having a molecular weight outside this range is too low to be of practical value. Furthermore, compositions derived from a polyamide having a molecular weight of less than about 1000, do not possess adequate bond strength retention under hot-wet conditions. In addition, polyamides having molecular weights of more than about 35,000 do not readily mix with the polyepoxides of this invention and also compositions prepared from such polyamides require excessive time to form a bond between substrates. Therefore, in order to obtain practical bond strengths and the desired bond strength retention under elevated temperatures and hot-wet conditions it is necessary that the polyamide have a molecular weight that is within the aforesaid molecular weight range of about 1,000–35,000. Highest bond strengths are obtained by use of a polyamide having a molecular weight of about 5,000–15,000.

The polyepoxides used in this invention are known in the art, being disclosed, for example, in Lee and Neville, "Epoxy Resins," McGraw-Hill Book Company, New York (1957), Chapter 1. These polyepoxides are characterized as having at least two epoxy groups per molecule, with the remainder of the molecule being a carbon chain or a carbon chain interrupted with ether linkages. The preferred polyepoxides are obtained by the catalyzed reaction of a polyhydric alcohol, such as glycols, glycerine, trimethylol propane, (4-hydroxyphenyl) propane (also known as bisphenol A), polyhydric phenols, and polyphenols, with an excess of an epoxide such as epihalohydrins, and alkylene oxides. Many of these polyepoxides are described in U.S.P. 2,592,560.

Particularly preferred polyepoxides are those obtained by the reaction of bisphenol A and epichlorohydrin which have the empirical formula:

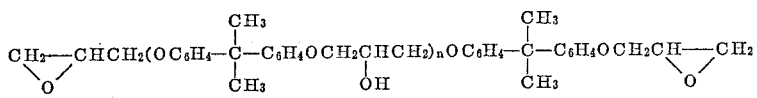

wherein $n$ has an average value of from 0 to about 10. Generally, $n$ will not be greater than 2 or 3, and it is preferably 0 to 1.

It is generally preferred that the polyepoxide be a syrup, that is, have a viscosity of from about 50 to about 200,000 centipoises at 25° C. In fact, for many uses it is essential that the polyepoxide be a syrup.

Relatively non-viscous polyepoxides or even polyepoxides having water-like viscosity can be blended with the polyamides of this invention to form adhesive compositions which exhibit bond strength retention at elevated temperature and under hot-wet conditions. However, these non-viscous polyepoxides have relatively low boiling points and thus are relatively volatile. Therefore, it is virtually impossible to use compositions prepared from such non-viscous polyepoxides as an adhesive between substrates wherein it is desirable to use heat to promote the reaction between the polyepoxide and the polyamide. In addition, such compositions tend to flow readily when subjected to a combination of heat and pressure. Thus, they cannot be used to bond together structural joints since some of the polyepoxide flows out from between the substrates leaving an insufficient amount to provide an adequate bond. However, there are some important uses for such compositions wherein these aforementioned deficiencies are of no consequence but wherein it is necessary to have the elevated temperature and hot-wet condition properties which these compositions exhibit, for example, use as a potting resin in the manner familiar to those skilled in the art.

Extremely viscous (i.e., over 200,000 centipoises at 25° C.) or even solid polyepoxides can be blended with the polyamides of this invention, for example, by dissolving the polyamide and the polyepoxide in a suitable solvent. However, the use of such an extremely viscous or solid polyepoxide imparts brittleness to the adhesive bond thus making such polyepoxides unsuitable for any use wherein impact strength is required. Even so, there are important applications wherein impact strength is not essential but wherein bond strength retention at elevated temperature and under hot-wet conditions is required, for example, in adhering name plates onto engine blocks.

Most of the polyepoxides of this invention have an epoxide equivalence of approximately 50 to 500. Epoxide equivalence is the weight of the polyepoxide in grams which contains one gram chemical equivalent of epoxy radical. It is to be understood that the epoxide equivalence is merely a convenient descriptive characterization value and is not a critical limitation of the polyepoxides operable in this invention.

The polyamides and polyepoxides used in the practice of this invention should be blended together in the proportion of 65–95 parts by weight of polyamide and 5–35 parts by weight of polyepoxide. Proportions outside of these specified ranges will result in compositions which do not possess bond strength retention at high temperatures and under hot-wet conditions.

The manner in which the polyamides and polyepoxides of this invenion are blended together is not critical. The polyamide may be dissolved in a suitable polyamide solvent such as dimethylacetamide or dimethylformamide and the polyepoxide may then be added to the solution and mixed therewith. This polyamide solvent may be used in an amount sufficient to form a paste which can be directly applied to the surfaces to be adhered, or enough solvent can be used to form a liquid composition. Ultimately, the polyamide solvent can be removed by any convenient method, e.g., precipitation, air drying, spray drying, etc., to obtain a powdered blend of the polyamide and polyepoxide. The resultant powder may then be used to adhere surfaces together in the manner shown hereinbelow. Preferably, a fine powder of the polyamide is intimately mixed together with the polyepoxide without the use of a polyamide solvent. If desired, a suitable solvent for the polyepoxide may be used to facilitate this mixing procedure, or sufficient polyepoxide solvent may be used to form a paste. Suitable solvent for polyepoxides include acetone, methyl ethyl ketone, toluene and other aromatic solvents, trichloroethylene, perchloroethylene, and other chlorinated hydrocarbon solvents and the like. The compositions of this invention may also be prepared in the physical form of a film or tape by any of the methods familiar in the art. Generally, higher bond strengths are obtained when the composition is prepared by mixing the powdered polyamide and the polyepoxide without the use of a polyamide solvent.

The compositions of this invention may be used as adhesives for many different types of materials such as wood and other cellulosic materials, leather, glass, plastics and so forth. However, these compositions are primarily intended for use in adhering together metal substrates. These compositions can be used as adhesives for any metal including aluminum, magnesium, molybdenum, tungsten, iron and the iron alloys such as the various steels, and the like.

In the practice of this invention, it is preferred to thoroughly clean or degrease the metal surface to be adhered and then etch the surface by treatment with acid prior to applying the adhesive composition. If the surfaces to be adhered together can be conveniently placed in a horizontal position, it is preferred to use a powder composition preferably prepared as mentioned above by mixing the polyamide and polyepoxide together without the use of a polyamide solvent. Otherwise a film, tape or paste composition can be used. A relatively thin layer of the adhesive composition is applied to one of the surfaces. Then the other surface is placed into position and this assembly is pressed under a relatively light load (i.e., about 10 to 2,000 p.s.i.) at a temperature of about 350° F.–600° F. for sufficient time to complete the interaction (crosslinking) of the polyamide and the polyepoxide, usually about 10–60 minutes. The metals thus joined are ready for use as desired. Other procedures for using the compositions of this invention will be obvious to those skilled in the art.

The following examples further illustrate preferred embodiments of this invention. In each of these examples, to provide correlative data, strips of 7075–T6 aluminum (Lyman, Ed., Metals Handbook, vol. I, "Properties and Selection of Metals," American Society for Metals, Novelty, Ohio, 8th Ed., 1961, p. 948) were used as the metal substrates. These aluminum strips were 0.065 inch thick and measured 1 in. x 3 in. These strips were degreased by suspending them in trichloroethylene vapor. Following the degreasing, these strips were etched in a chromic acid bath at 70° C. for 30 minutes, washed in cool water and then dried. Standard lap joints were prepared by applying the various compositions shown onto the surface of one strip and then positioning another strip on top thereof to form a 0.5 inch overlap (ASTM D1002–53T). These lap joints were then pressed together with 2,000 p.s.i. pressure at 450° F. for 30 minutes (except as noted). The bond strengths of the various adhesive compositions were evaluated by determining the lap shear strengths of the prepared lap joints, in accordance with ASTM D1002–53T, whereby the strips were pulled apart at a rate of 0.2 in./min. at a jaw separation of 4½ inches. All of the lap shear strength values shown are the average of at least 3 trials.

*Example I*

Eleven grams of dry powdered (100 mesh) poly (hexamethylene isophthalamide) having a molecular weight of 9,000 was blended with 1 gram of a commercially available polyepoxide by grinding in a mortar for several minutes. The polyepoxide was the reaction product of bisphenol A and epichlorohydrin having a manufacturer's specified viscosity of 5,000–15,000 centipoises at 25° C., an average molecular weight of 350–400, and a specified epoxide equivalence of 175–210. Lap joints were prepared as described above, using this resultant powder, and tested. The average lap shear strength at room temperature was 6,000 p.s.i. The average lap shear strength at 100° C. was 4,900 p.s.i. and at 150° C. was 4,300 p.s.i. Lap joints tested after being heated in a steam autoclave at 250° F. and 15 p.s.i.g. for 24 hours had an average lap shear strength of 2,500 p.s.i. Lap joints tested after such steam autoclave treatment for 66 hours had an average lap shear strength of 2,640 p.s.i. Lap joints tested after boiling in water for 15 hours had an average lap shear strength of 3,700 p.s.i.

The following example shows results obtained with a composition based upon a nylon-type interpolyamide used in the art to obtain the best results heretofore attainable for a polyamide-polyepoxide metal adhesive composition:

*Example II*

Example I was repeated using in place of the poly (hexamethylene isophthalamide), an interpolyamide of about 40% by weight hexamethylene adipamide, about 30% hexamethylene sebacamide and about 30% caprolactam, having a molecular weight of about 25,000. The polyepoxide was the same as in Example I. The ratio of polyamide used was 85 to 15. In addition, approximately 1.5 parts by weight of dicyandiamide were added. The lap joints were formed as in Example I except that the temperature was 350° F. and the time was one hour. The changes in conditions from those shown in Example I were found by experimental trial to be necessary in order to obtain the best results with this interpolyamide. The average lap shear strength at room temperature was 7,000 p.s.i. The average lap shear strength at 100° C. was 2,600 p.s.i., and at 150° C. was 2,400 p.s.i. Lap joints tested after being heated in a steam autoclave at 250° F. and 15 p.s.i.g. for 24 hours had an average lap shear strength of 940 p.s.i. Lap joints tested after such steam autoclave treatment for 66 hours had an average lap shear strength of 360 p.s.i. Lap joints tested after boiling in water for 15 hours had an average lap shear strength of 1,900 p.s.i.

The following example was taken from data reported in Lee and Neville, "Epoxy Resins," McGraw-Hill Book Company, New York (1957), page 224. This example shows results obtained from a fatty acid-type polyamide.

*Example III*

Fifty parts by weight of a polyamide such as the reaction product of triethylene diamine and the dimeric acid of linoleic acid having an amine equivalence of 210–230 which is the ml. of KOH equivalent to the base content of 1 gram of the polyamide as determined by titration with HCl, is blended with 50 parts of the polyepoxide such as used in Example I. The average lap shear strength at room temperature is 3,200 p.s.i., at 82° C. is 1,500 p.s.i., and at 120° C. is 600 p.s.i. These properties are obviously inferior to those of the composition of the present invention.

For convenience of reference, the results of Examples I, II, and III are reproduced below in Table 1. In this table, the values of the lap shear strength tests in p.s.i. are listed first. The percentage figure shown in parentheses following each particular lap shear strength value is the percent of that value compared to the lap shear strength at room temperature and thus is indicative of the bond strength retention under various conditions.

TABLE 1

|  | Example I (Composition of this invention) | Example II (Nylon-Type Interpolyamide) | Example III (Fatty Acid-Type Polyamide) |
| --- | --- | --- | --- |
| Lap Shear Strength: |  |  |  |
| At room temp | 6,000 | 7,000 | 3,200 |
| At 100° C | 4,900 (82%) | 2,600 (37%) | At 120° C.: |
| At 150° C | 4,300 (72%) | 2,400 (34%) | 600 (19%) |
| After steam autoclave for 24 hours | 2,500 (42%) | 940 (13%) | -------------- |
| After steam autoclave for 66 hours | 2,640 (44%) | 360 (5%) | -------------- |
| After boiling for 15 hours | 3,700 (62%) | 1,900 (27%) | -------------- |

The superior results obtained by the composition of this invention are readily apparent from Table 1. At room temperature the composition of Example II, based upon the nylon-type interpolyamide of the art, actually gave a higher bond strength than did the composition of this invention. However, under the adverse conditions of heat and water indicated, surprisingly, the composition of this invention not only had a far greater percent bond strength retention than did the compositions representative of the art, but also the actual bond strength values were considerably higher.

The following examples are illustrative of some of the other compositions of this invention:

*Example IV*

Ten grams of dry powdered (100 mesh) poly (hexamethylene isopthalamide) having a molecular weight of 9000 was blended with 2 grams of a commercially available polyepoxide by grinding in a mortar for several minutes. The polyepoxide was a glycidyl ether of glycerol diepoxide having a manufacturer's specified viscosity of 150–200 centipoises at 25° C., an average molecular weight of 300, and a specified epoxide equivalence of 140–165. Lap joints were prepared as described above, and tested. The average lap shear strength at room temperature was 5600 p.s.i. Then tested at elevated temperatures and under hot-wet conditions as shown in Example I, similar results thereto are obtained.

Example V

Example IV was repeated using in place of the polyepoxide used therein, a polyepoxide having the formula:

$$H_2C-HC-CH_2-O-\underset{O}{\underset{|}{\bigcirc}}-CH_2-\underset{|}{\bigcirc}-OCH_2-CH-CH_2$$

and having a viscosity of 110,000 centipoises at 25° C., an average molecular weight of 312, and an epoxide equivalence of 180. The average lap shear strength at room temperature was 5800 p.s.i. When tested at elevated temperatures and under hot-wet conditions as shown in Example I, similar results thereto are obtained.

Example VI

Ten grams of dry powdered (100 mesh) poly (hexamethylene 5-t-butyl-isophthalamide) having a molecular weight of 5500 was blended with 1 gram of the polyepoxide shown in Example I. Lap joints were prepared and tested. Lap shear strengths at room temperature and at an elevated temperature were determined as shown in Example I. At 150° C. the lap joints retained 68% of the room temperature lap shear strength.

Example VII

Ten grams of dry powdered (100 mesh) poly (ethylene isophthalamide) having a molecular weight of approximately 9000 were blended with 1 gram of the polyepoxide used in Example I. Lap joints made by pressing at 625° F. for 1 minute were tested. There was observed an actual increase in lap shear strength of 33% at 250° C. as compared to the room temperature lap shear strength.

Example VIII

Ten grams of dry powdered (100 mesh) poly (trimethylene isophthalamide) having a molecular weight of approximately 6500 were blended with 1 gram of the polyepoxide used in Example I. Lap joints were made by pressing at 600° F. for 5 minutes. The lap shear strength at 250° C. was the same as the lap shear strength at room temperature.

Example IX

Ten grams of dry powdered (100 mesh) poly (tetramethylene isophthalamide) having a molecular weight of approximately 6200 was blended with 1 gram of the polyepoxide used in Example I. Lap joints were made as shown in Example VIII, and tested. At 150° C. the lap joints retained 75% of the room temperature lap joint strength.

Example X

Ten grams of dry powdered (100 mesh) poly (1,2-propylene isophthalamide) having a molecular weight of approximately 7200 was blended with 1 gram of the polyepoxide used in Example I. Lap joints were made by pressing at 525° F. for 15 minutes, and then tested. At 150° C. the lap joints retained 96% of the room temperature lap shear strength.

Example XI

Ten grams of dry powdered poly (decamethylene isophthalamide) having a molecular weight of 11,000 was blended with 2 grams of the polyepoxide used in Example I. Lap joints were made as shown in Example I. The lap joint shear strength at room temperature was 5400 p.s.i. When tested as shown in Example I similar results are obtained.

Other polyamides derived from an alkylene diamine having 2–16 carbon atoms and other $C_1$–$C_5$ alkyl-isophthalic acids, including methyl-isophthalic acid, propyl and isopropyl-isophthalic acid, hexyl-isophthalic acid and so forth, or a halogenated isophthalic acid such as chloro-isophthalic acid, fluoro-isophthalic acid, and the like, provide similar results.

This invention has been described in considerable detail, but since many obvious modifications and variations of these details can be made without departure from the spirit and scope of this invention, it is to be understood that this invention is not intended to be limited except as shown in the appended claims.

I claim:

1. An adhesive composition consisting essentially, per 100 parts by weight, of 65–95 parts by weight of a polyamide consisting essentially of recurring groups of the general formula:

$$-N(R_1)-N-\overset{O}{\underset{H}{C}}-\underset{R_2}{\bigcirc}-\overset{O}{C}-$$

wherein $R_1$ is an alkylene radical having 2–16 carbon atoms and $R_2$ is a member of the group consisting of hydrogen, $C_1$–$C_5$ alkyl radicals, and halogens, said polyamide having a molecular weight of 1,000–35,000, and 5–35 parts by weight of a polyepoxide having at least two epoxy groups per molecule and also having a viscosity of 50–200,000 centipoises at 25° C.

2. A composition according to claim 1 wherein the polyamide is poly(hexamethylene isophthalamide) having a molecular weight of 5,000–15,000.

3. A composition according to claim 1 wherein the polyamide is poly(hexamethylene 5-t-butyl-isophthalamade) having a molecular weight of 5,000–15,000.

4. A composition according to claim 1 wherein the polyamide is poly(ethylene isophthalimide, poly(trimethylene isophthalamide), or poly(1,2-propylene isophthalamide).

5. A structure having two surfaces adhesively joined together with the composition of claim 1.

6. A structure according to claim 5 wherein the polyamide of said composition is poly(hexamethylene isophthalamide) having a molecular weight of 5,000–15,000.

7. A structure according to claim 5 wherein the polyamide of said composition is poly(hexamethylene 5-t-butyl-isophthalamide) having a molecular weight of 5,000–15,000.

References Cited by the Examiner

UNITED STATES PATENTS

| | | | |
|---|---|---|---|
| 2,705,223 | 3/1955 | Renfrew et al. | 260—830 |
| 2,715,620 | 8/1955 | Carlston et al. | 260—78 |
| 2,799,596 | 7/1957 | Frantz | 260—830 |
| 2,970,077 | 1/1961 | Groves | 260—830 |
| 2,986,539 | 5/1961 | Schniepp et al. | 260—830 |

MURRAY TILLMAN, *Primary Examiner.*

J. C. BLEUTGE, *Assistant Examiner.*